May 8, 1951        R. G. BENNETT        2,551,655

MICA SLITTING MACHINE

Filed June 22, 1948        4 Sheets—Sheet 1

INVENTOR.
Richard G. Bennett
BY A. L. B. Richardson
Attorney

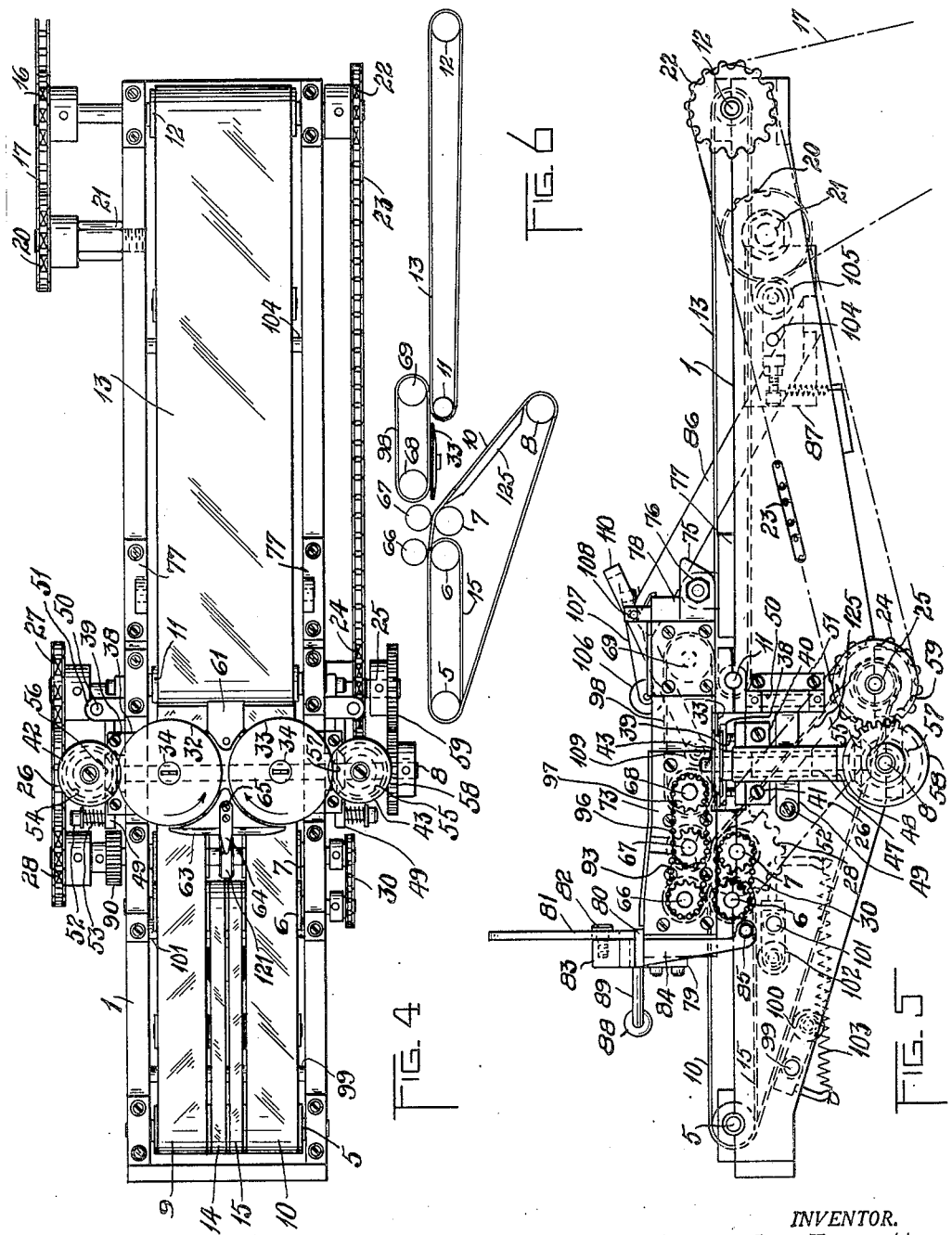

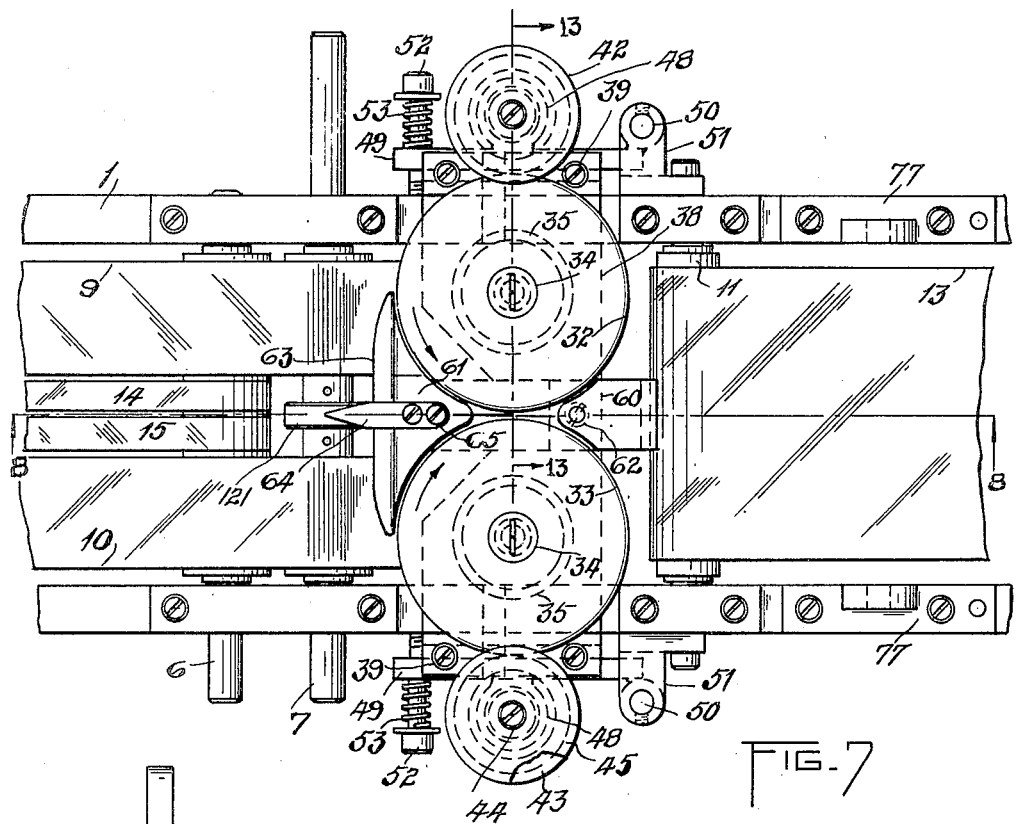

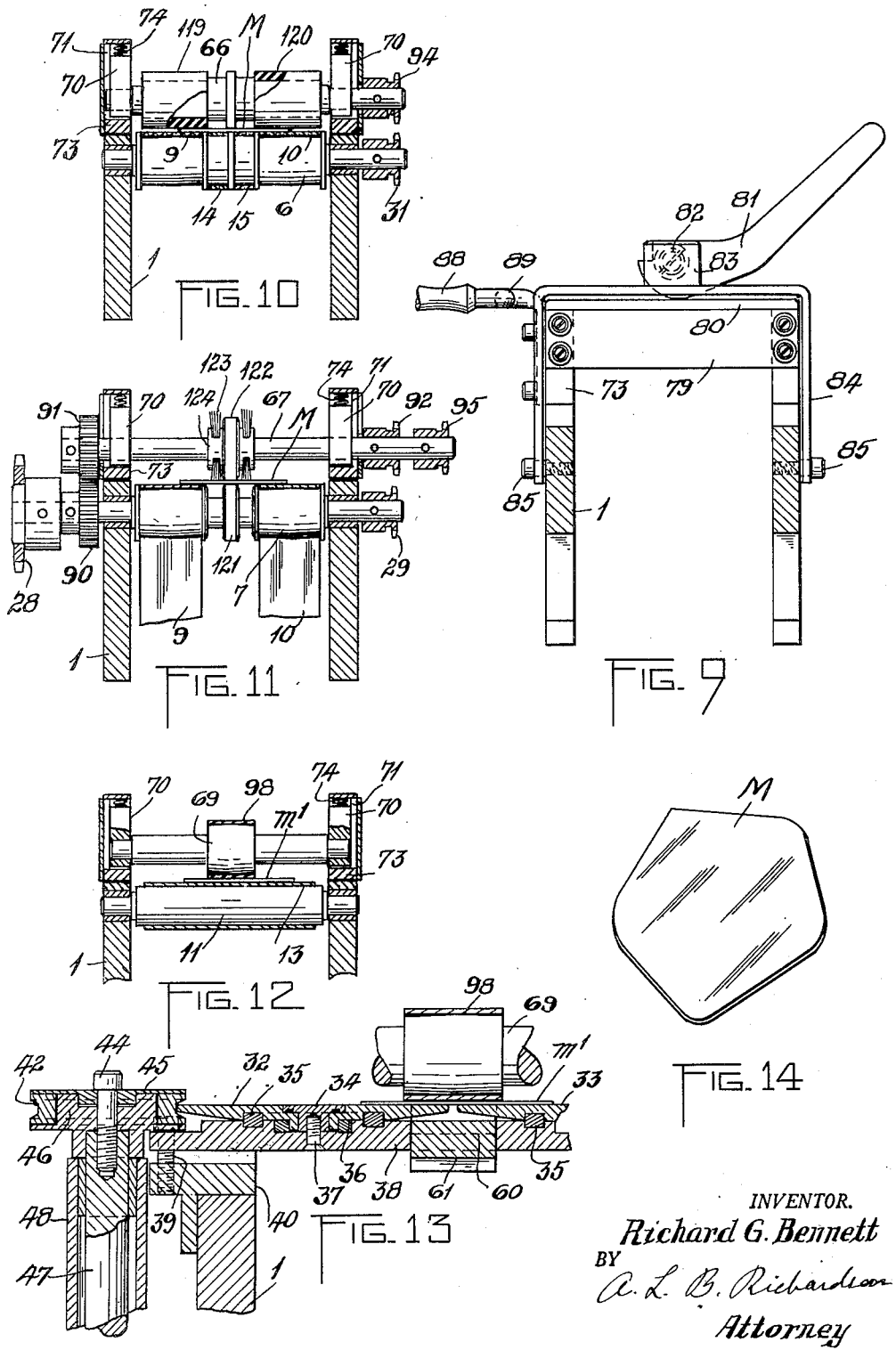

Patented May 8, 1951

2,551,655

UNITED STATES PATENT OFFICE 2,551,655

MICA SLITTING MACHINE

Richard G. Bennett, Jamestown, N. Y., assignor to Sylvania Electric Products Inc., a corporation of Massachusetts Application June 22, 1948, Serial No. 34,372

6 Claims. (Cl. 125—24)

The present invention relates to improvements in the art of splitting sheet material of foliated structure such as mica and more particularly to a machine for performing such splitting operation.

An object of the present invention is to facilitate the splitting of thick sheets of mica into thin sheets of predetermined thickness.

Another object of the present invention is to prevent the cracking, breaking, or shaling of the laminae of the mica as they are separated by the introduction of a slitting tool into the edge of a sheet.

Another object of the present invention is the provision of a conveying system whereby work pieces may be maintained in a centralized position with respect to a slitting tool.

A further object of the present invention is the elimination of friction in a mica slitting machine caused by the work pieces contacting movable feeding elements, said friction tending to separate laminae on other than the predetermined lines of cleavage.

Still a further object of the present invention is the provision of an automatically operable machine for the rapid slitting of sheets of mica on a production basis.

Featuers of the present invention are directed to the construction, arrangement, and adjustability of a novel slitting tool together with an effective means for gripping thin sheets of laminated material such as mica and moving them into engagement with a slitting tool.

Still further features of the present invention are directed to a machine having a plurality of upper and lower rollers in the feeding and conveying system for the mica, which may readily be moved into and out of operative position without disturbing the roller assembly, thus permitting ready access to the slitting tool and associated parts.

The material upon which the present machine is adapted to operate includes thin sheets or plates of mica of irregular contour and of varying surface areas and thicknesses. These sheets are carried by a suitable conveying means one after another to a first and then to a second pair of feed rollers, the two pairs of rollers being close enough together as to simultaneously grip a sheet of mica when its forward edge is presented to the slitting means. The pointed end of a stationary knife acts as the slitting means and is followed by a transversely extending plate having a beveled edge over and under which the top and bottom layers respectively of a slit work piece ride. Separate conveyor means are provided to carry the separate laminae to their discharge points. The conveyor system is preferably supported upon a stationary base to which is hingedly conected a movable frame carrying the upper ones of the above mentioned pairs of rollers and additional rollers over which a feed belt is carried. Preferably, the said two pairs of feed rollers are so arranged that the mica sheet is curved slightly, with the convex side up, as the edge of the sheet is presented to the slitting knife. Thus a sheet of a thickness equal to, or less than, a pre-determined limit passes freely under the slitting knife without scratching or shaling the surface thereof. This bowing of the mica sheet also serves to counteract any slight natural bow which the material may have.

The present invention will be more fully understood by reference to the following detailed description which is accompanied by a drawing in which:

Figs. 4 and 5 are illustrations in plan view and side elevation, respectively, of the machine of Fig. 1 with the cabinet and housings removed. The upper feed rollers and their supporting frame are also not shown in Fig. 4;

Fig. 6 is a fragmentary side view showing the work feeding means of the machine in Fig. 1.

Fig. 7 is an enlarged fragmentary plan view of parts shown in the central portion of Fig. 4 but with the associated gears and sprocket wheels removed;

Fig. 8 is a sectional view taken along 8—8 of Fig. 7, but, however, including the movable upper frame and rollers carried thereby, which are not shown in Fig. 7;

Fig. 9 is an end view as seen through the left-hand side of Fig. 8;

Figure 1:
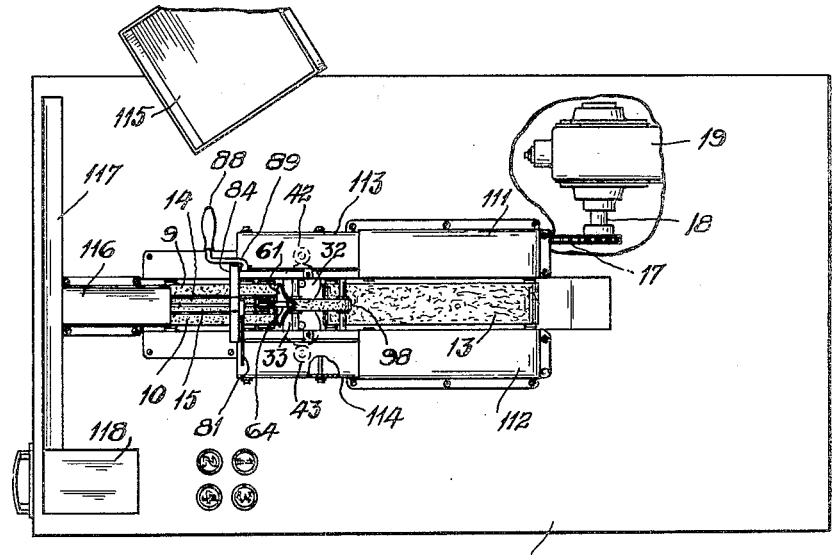
Fig. 1 is a plan view of a machine embodying principals of the present invention and with a section of the cabinet broken away to show the driving means.

Figs. 10, 11, and 12 are cross-sections taken on lines 10—10, 11—11, and 12—12, respectively, of Fig. 8 with cylindrical parts shown in elevation;

Fig. 13 is a sectional view on line 13—13 of Fig. 7;

And Fig. 14 is a perspective view of a typical work piece.

In the drawings similar reference numerals refer to similar parts throughout the several views.

Figure 2:
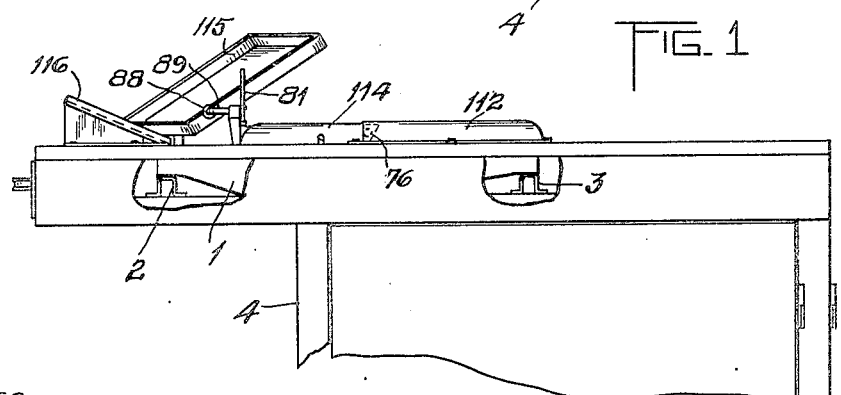
Fig. 2 is a side elevation of the machine of Fig. 1, the upper part only of the cabinet being shown.

Reference may now be made to the drawing, particularly Figs. 1, 2 and 4, wherein there is shown a rectangular open frame supported upon cross bars 2 and 3 in an opening in the top wall of a cabinet 4. Journalled in the side walls of frame 1, from left to right, are the reduced end portions of rollers 5, 6 and 7; rollers 5 and 6 being in the same plane but separated a substantial distance, while rollers 6 and 7 are close to each other with the axis of roller 7 slightly below that of roller 6. In advance of roller 7 and journalled in the side walls of frame 1 at a still lower plane is a roller 8 (see also Fig. 6). The rollers are flanged, as indicated for 6 and 7 in Figs. 10 and 11, for guiding in transverse spaced relation two endless feeding-in belts 9 and 10. The upper reach of each of these belts has a horizontal portion, a comparatively short intermediate portion between rollers 6 and 7, which, in this instance, is inclined approximately 5° to the horizontal, and a considerably steeper angularly disposed portion between rollers 7 and 8.

Also journalled in the side walls of frame 1 are rollers 11 and 12 over which a wider belt 13 engages, the upper reach of this belt being a continuation of the conveyor system for receiving work pieces which have passed over the knife, as will be explained later.

Engaging rollers 5 and 6 in the space between belts 9 and 10 are two narrow belts 14 and 15 spaced slightly apart from each other, and from belts 5 and 6 by interposed flanges on the rollers.

Certain of the rollers have extended shafts leading outwardly from their bearings. To one such extending shaft on roller 12 is secured a sprocket 16 driven by a chain 17 from shaft 18 of the gear reduction unit 19 of a suitable motor, the chain also engaging an idle sprocket 20 on stud 21 (Fig. 4). On the other end of roller shaft 12 is a sprocket 22 which through chain 23 drives a sprocket 24 on a transverse shaft 25 adjacent roller 3. A sprocket chain 26 engaging a sprocket 27 on the other end of shaft 25 drives a sprocket 28 fixed to roller shaft 7, roller 6 being driven by a smaller sprocket 29 on roller shaft 7 through chain 30 and sprocket 31. It will thus be observed that belts 9, 10, 13, 14 and 15 are all positively driven.

Intermediate the narrow feed belts 14 and 15 and the wide delivery belt 13, and above the diagonally disposed portions of the upper reaches of feed belts 9 and 10, are two horizontal discs 32 and 33 rotatable about vertical axes, each on a headed bushing 34 and provided with annular lubricating rings 35 and 36. The bushings 34 are secured by screws 37 to a transversely extending plate 38 which, by screws 39 adjacent each end, is adjustably supported in vertical spaced relation to brackets 40 into which the screws 39 are threaded, these brackets being secured, as by screws 41 (Fig. 5), to the side walls of frame 1.

The discs 32 and 33 are frictionally driven by yielding engagement of their peripheral edges with drive wheels 42 and 43, respectively. Each drive wheel is centered on and clamped to the header 46 of a vertical shaft 47 by a screw 44 and cap 45; the shaft 47 has a bearing in the cylindrical, intermediate cross-arm 48 of a horizontally disposed bar 49. At one end bar 49 has hinge connection 50 with a bracket 51 on the adjacent side wall of frame 1, and, at its other end, has a slot for receiving a screw 52 extending laterally from frame 1, a coiled compression spring 53 encircling the screw between its head and the bar 49. Adjustment of the screws 52 to vary the compression of springs 53 thus determines the yielding pressure of the drive wheels against their respective discs 32 and 33.

A miter gear 54 on the lower end of one shaft 47 and a like gear 55 on the other shaft 47 are driven by miter gears 56 and 57, carried on roller shaft 8. Chain drive shaft 25 drives roller shaft 8 through spur gears 58 and 59.

The adjustable plate 38 is cut away at its center, except for a rear connecting strap portion 60 (see Figs. 7 and 8), to receive the center leg of a T-shaped knife holder 61 and to which connecting portion the holder is secured by screw 62. The front or forward edge 63 of the cross arm of the holder is beveled and of an extent equal to the distance between the centers of discs 32 and 33, the edge portions of the cross bar adjacent discs 32 and 33 are curved to closely follow the circumference of the discs. The cross arm is recessed at its center to receive a longitudinally extending knife 64 which by screws 65 is removably secured to the holder. The knife is opposed to the direction of feed and projects to a point just short of a plane passing through the axes of rollers 7 and 67. The side edges of the nose or projecting portion of the knife are tapered and its under face is beveled, the bottom of the holder 61 also being undercut to provide clearance for work pieces passing under the knife. The top face of the knife 64, that part of holder 61 into which the top of beveled part 63 converges, and the top faces of discs 32 and 33 lie in the same horizontal plane.

To facilitate feeding of work pieces through the machine, provision is made for a relative separating movement between upper rollers of the feeding and conveying mechanism and the respective lower members with which they cooperate. In this instance the upper rollers, indicated at 66, 67, 68 and 69 and later to be described, are the movable members, their ends being journalled in bearing blocks 70 guided by ways 71 on the sides of slots 72 in the side walls of an upper, open rectangular frame 73. The sides of this frame 73 preferably are coincident with those of frame 1 but of less longitudinal extent. They normally rest upon fixed stops which, in the illustrated embodiment of the invention, are the cap pieces of the journal boxes for rollers 6, 7 and 11. Interposed between the blocks 70 and cover plates for slots 72 are compression springs 74. Ears 75 on one end of frame 73 are hinged to a transverse rod 76 carried by lugs upstanding from brackets 77 on the side walls of frame 1. End bars 78 and 79 connect the side walls of frame 73.

Also extending across the free end of frame 73 is a lock bar 80 (Figs. 5 and 9). This bar is engaged by the cam surface of a lever 81 pivoted at 82 to a block 83 carried by a yoke 84 which straddles frame 73 with the outer ends of its side arms pivotally connected to studs 85 in the side walls of frame 1. Throw of the lever 81 in one direction locks frames 1 and 73 together. Movement of the cam lever 81 in the opposite direction permits the swinging of yoke 84 to inoperative position and allows frame 73 and parts carried thereby to be raised so that access may be had to parts normally lying thereunder. An arm 86 extending angularly downward from end bar 78 and carrying a weight 87 provides a counterbalance for the pivoted frame 73, raising and lowering of the latter being facilitated by the provision of a handle 88 offset from the frame on an arm 89.

A spur pinion 90 on a shaft extension of roller 7 drives upper roller 67 to the shaft of which is fixed a pinion 91 meshing with gear 90 (see Fig. 11). On the other end of roller shaft 67 is a sprocket 92 which by chain 93 and sprocket 94 drives upper roller 66, and a like sprocket 95 which by chain 96 drives roller 68 through sprocket 97. Roller 68 lies across discs 32 and 33 in front of their axial centers and is the driving means for a comparatively narrow feed belt 98 running over rollers 68 and 69, roller 69 being adjacent the pivotal connection 76 of frame 73. The feed belt 98, as shown in Fig. 6, lies over and between discs 32 and 33.

Mounted in frame 1, Figs. 4 and 5, is a rod 99 which carries a conventional type of roller belt tightener for belts 9 and 10, and indicated generally by numeral 100, and, on rod 101, a like tightener 102 for belts 14 and 15. These two tighteners are opposed to each other on their supporting rods and yieldingly held in operative position by a common spring 103 connecting arms depending therefrom. Also mounted in frame 1 is a rod 104 carrying a spring actuated roller type tightener 105 for belt 13.

The upper reach of belt 98 is held tight by a roller 106 mounted in the side arms of an inner yoke 107 pivoted and spring actuated on a rod 108 extending between lugs upstanding from end bar 76 of frame 73. The lower reach of belt 98 is held in contact with discs 32 and 33 and delivery belt 13 by a roller 109 (Fig. 5) mounted in the arms of an outer yoke 110 also pivoted on rod 108.

As illustrated in Figs. 1 and 2, suitably formed housings 111 and 112 attached to the work table, which is the top wall of cabinet 4, and housings 113 and 114, attached to movable frame 73, are provided for gearing and other drive mechanism.

Work may be placed on the conveying members by any preferred means. In the illustrated embodiment of the machine, this operation is performed manually by an operator at the left of the cabinet 4 who takes the mica sheets from a supply box 115 and places them flatwise on a chute 116 from which they are deivered one after another onto the upper reaches of belts 9, 10, 14 and 15, all of which travel at the same speed. Waste particles may be brushed into a trough 117 and thence into a receptacle 118.

When a sheet of mica reaches the pair of feed rollers 6 and 66 it passes off the narrow belts 14 and 15, but the feed is continued by belts 9 and 10. The side portions of the work piece are held in contact with belts 9 and 10 by the pressure of soft rubber sleeves 119 and 120 carried by roller 66. The work piece is thereby fed to the second pair of feed rollers 7 and 67 which include comparatively narrow centrally disposed contacting portions 121 and 122, respectively, of hardened steel. Brushes 123 extending radially from collars 124 on roller 67 each side of part 122, wipe the side edges of part 121 and prevent accumulation of extraneous matter at this part of the machine.

By having the peripheral belt engaging surfaces of roller 7 slightly below those of roller 6, contact of belts 9 and 10 with roller 6 is assured and the angularly disposed portion of the belt between the rollers is held taut. Furthermore, the work M is directed against the knife 64 in approximately a median line between the top and bottom surfaces of the wedge-shaped work splitter end of the knife (see Fig. 3), the result being that the consequent slight flexing of the split mica is equal above and below the knife. Thus, the split mica in its continued movement does not laminate or explode and such angular feed permits the top surface of the wedge portion of the knife to lie in a horizontal plane.

Figure 3:
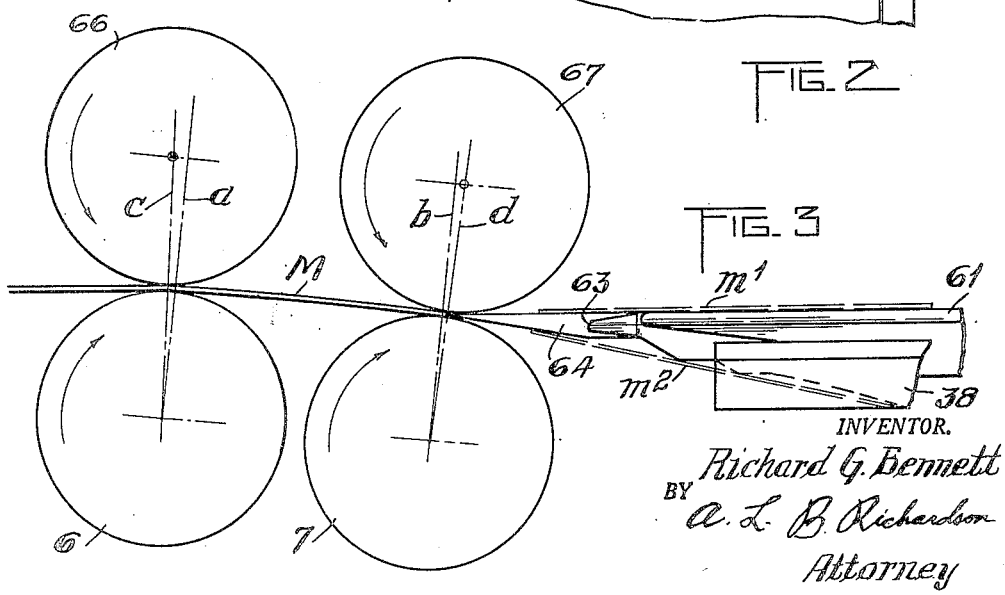
Fig. 3 is an enlarged view illustrating schematically the relative arrangement of the slitting tool, the adjacent feed rollers and the work pieces.

As illustrated in Fig. 3, the centers of rollers 66 and 67 are spaced slightly farther apart than those of rollers 6 and 7. That is, instead of being located in planes, indicated by broken lines $a$ and $b$ at right angles to the angular feed portion of belts 9 and 10, they are in planes $c$ and $d$ which bear to the left and right, respectively, of planes $a$ and $b$, the angle between $a$ and $c$ preferably being slightly greater than that between planes $b$ and $d$.

By this arrangement of the rollers, thin micas will tend to bow and pass under the knife without being slit. With thicker micas less bowing takes place, the sheets passing through the rollers in a more flattened condition to the knife which slits them to a predetermined thickness. Definitely putting a downward bow in micas already within tolerance overcomes any possible upward bowing that might exist and thus prevents shaling as they pass under the knife, all of which results in more constant slitting and less waste of material.

The beveled edge 63 of holder 61 enters the line of cleavage between split portions of the mica, the top part passing over the holder onto the discs 32 and 33 which, turning in opposite directions, keep this upper portion, indicated in Figs. 3 and 13, at $m^1$, centered and, in cooperation with belt 98, feed it onto delivery belt 13. The bottom portion $m^2$ of the split sheet, and micas within tolerance and not engaged by the knife, pass under the knife and are deflected by the curved under surface of holder 61 so as to drop upon the obliquely disposed portions of belts 9 and 10.

From belts 13 and 9, 10 the work pieces $m^1$ and $m^2$ are discharged into chutes from which they are delivered to mechanism for any further processing which may be desired. Such mechanism, not being a part of the present invention, has not been shown or described.

What is claimed is:

1. In a mica slitter, a first and a second pair of rollers, one of each such pair being the lower and the other the upper roller, said lower rollers being mounted in fixed bearings and said upper rollers having their peripheral surfaces relatively movable to those of the lower rollers, means for feeding a sheet of mica to said first pair of rollers, means for driving the rollers, and a fixed knife opposed to the direction of mica feed and having its cutting edge projecting between the rollers of said second pair, said pairs of rollers being in such proximity to each other that a sheet of mica is engaged by both pairs when an end edge thereof contacts said knife, the axial spacing of said upper rollers being greater than that of said lower rollers whereby said sheet of mica is caused to flex downwardly as it engages said knife.

2. A mica splitting machine including a fixed splitting knife, and a first pair and a second pair of parallel feed rollers for advancing work pieces against said splitting knife, the axial plane of said second pair of rollers being so tilted with respect to the axial plane of said first pair of rollers as to cause a downward bowing of said work pieces as they are presented to said splitting knife.

3. In a mica slitter, a pair of rollers, means for driving said rollers, means for feeding a sheet of mica to said rollers, a knife opposed to the direction of mica feed and projecting between the peripheral surfaces of said rollers, a pair of discs in rear of said knife rotatable in opposite directions and adapted to receive the layer of split mica passing above said knife, a delivery belt having its upper reach in the plane of said discs, a second belt cooperating with said discs to feed said upper mica layer onto said delivery belt, means for rotating said discs, and means for positively driving said belts.

4. The combination, in a mica slitter, of a pair of laterally spaced feed belts, first and second lower rollers over which the upper reach of said belts engage, an upper roller for each of said lower rollers, the upper and lower rollers of each pair having annular grooves to provide belt engaging portions and an intermediate work engaging portion, a knife aligned with said intermediate portions, said knife being opposed to the direction of feed and arranged to engage an edge of the mica as it leaves the rollers adjacent thereto, a pair of discs onto which the upper layer of split mica is received as it leaves said knife, means for rotating said discs in opposite directions, a delivery belt having its upper reach in the plane of said discs, a belt cooperating with said discs to feed the mica from said discs onto said delivery belt, and means for positively driving all of said belts.

5. In a mica slitter, two parallel shafts, a roller fixed on each of said shafts, means for feeding thin sheets of mica successively to said rollers, a splitting knife for engaging an edge of the mica as it leaves said rollers, means for conveying the split mica from said rollers, and brushes extending radially from one of said shafts each side of the said roller thereon.

6. The combination, in a mica slitting machine, of two separable frames, a pair of discs rotatable in opposite directions, a slitting knife in advance of said discs, conveying means for delivering sheet micas edgewise to said knife and a discharge belt all supported in one of said frames, rollers and a belt carried by the other of said frames, said rollers cooperating with said conveyor in feeding micas to said knife and said belt cooperating with said discs in feeding micas onto said discharge belt which pass over said knife.

RICHARD G. BENNETT.

REFERENCES CITED

The following references are of record in the file of this patent:

UNITED STATES PATENTS

| Number | Name | Date |
|---|---|---|
| 901,130 | Walchner | Oct. 13, 1908 |
| 1,155,298 | Cooper | Sept. 28, 1915 |
| 1,185,881 | Cooper | June 6, 1916 |
| 1,194,155 | Edgecomb | Aug. 8, 1916 |
| 1,831,061 | Frederick | Nov. 10, 1931 |
| 1,879,164 | French | Sept. 27, 1932 |
| 2,270,568 | Waterman et al. | Jan. 20, 1942 |
| 2,329,593 | Cooper et al. | Sept. 14, 1943 |